March 24, 1925.
H. D. WILLIAMS
POWER TRANSMITTING DEVICE
Filed Sept. 20, 1924
1,530,967
2 Sheets-Sheet 1
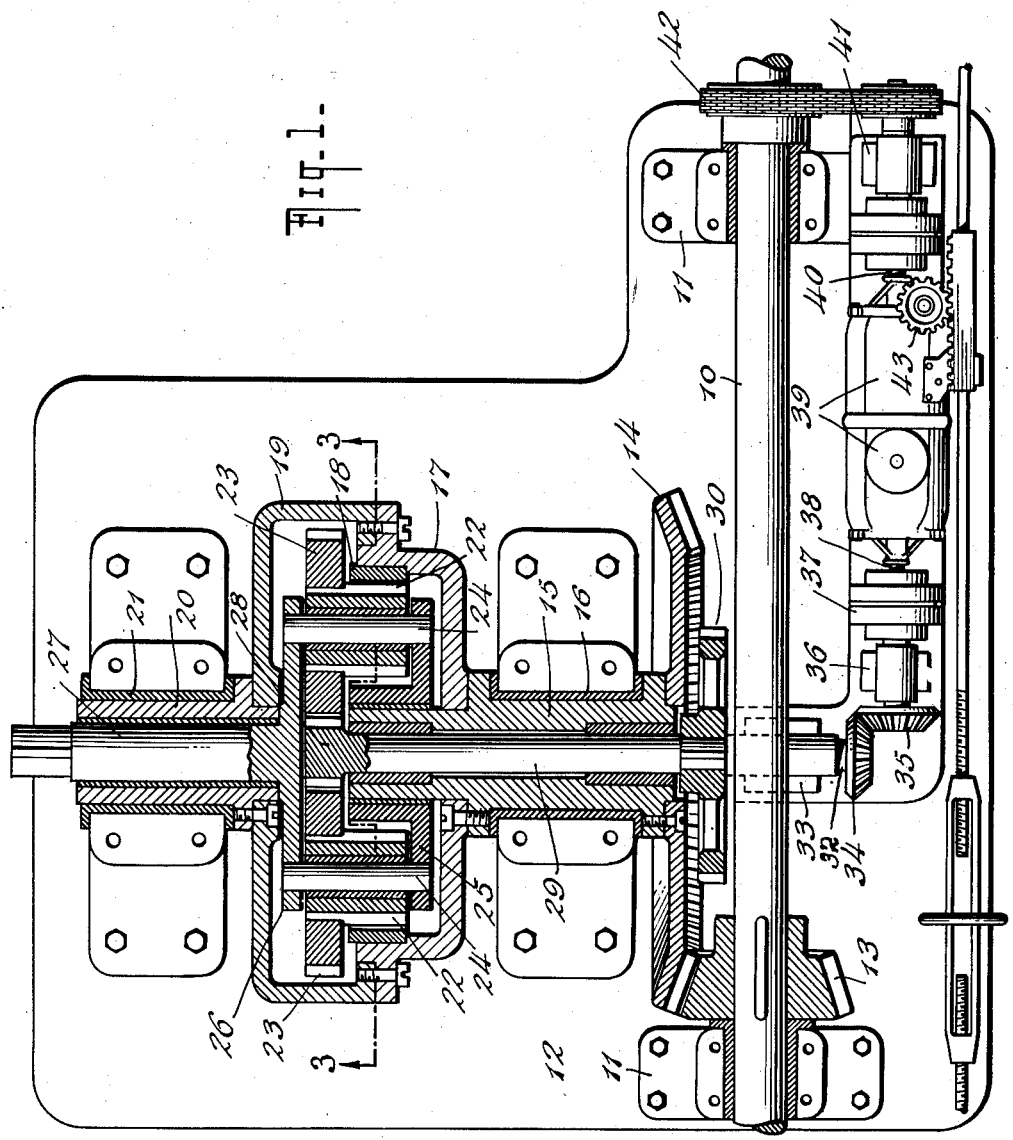
INVENTOR
HARVEY D. WILLIAMS
BY
ATTORNEYS March 24, 1925.
H. D. WILLIAMS
1,530,967
POWER TRANSMITTING DEVICE
Filed Sept. 20, 1924    2 Sheets-Sheet 2
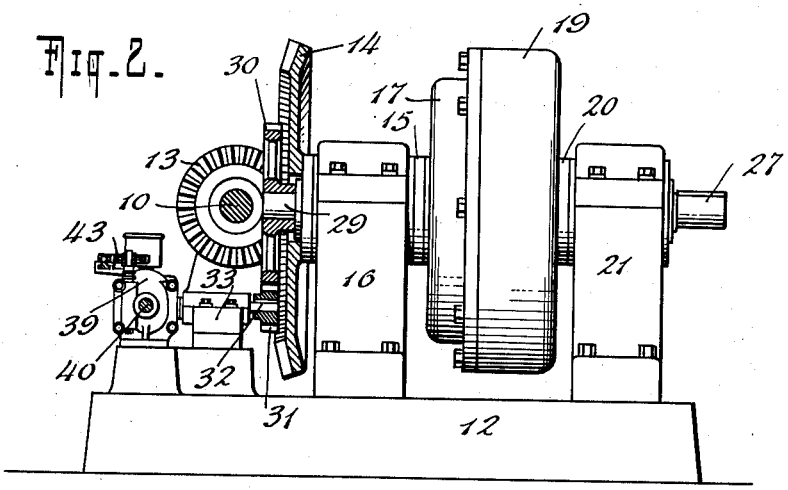
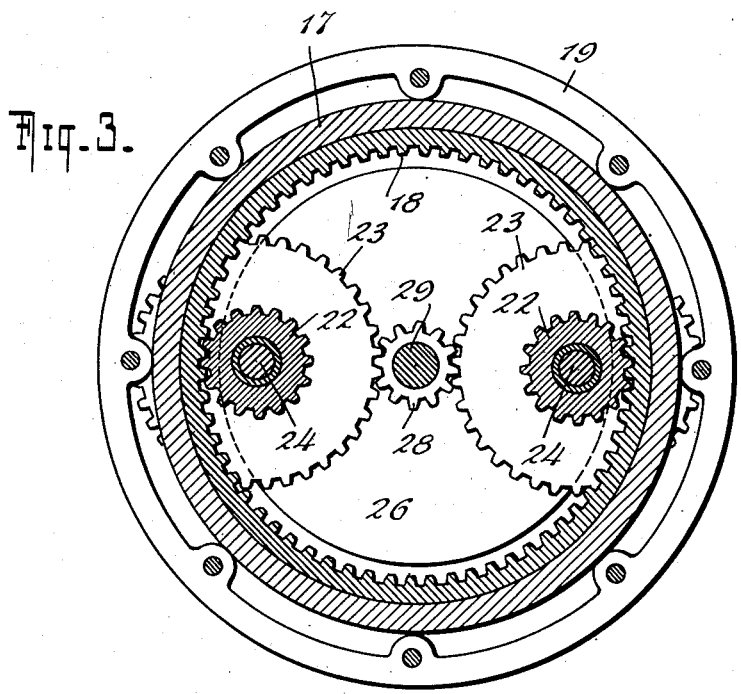
INVENTOR
HARVEY D. WILLIAMS
BY
ATTORNEYS Patented Mar. 24, 1925.

1,530,967

UNITED STATES PATENT OFFICE.

HARVEY D. WILLIAMS, OF WALLINGFORD, CONNECTICUT, ASSIGNOR TO THE WATERBURY TOOL COMPANY, OF WATERBURY, CONNECTICUT, A CORPORATION OF CONNECTICUT.

POWER-TRANSMITTING DEVICE.

Application filed September 20, 1924. Serial No. 738,734.

*To all whom it may concern:*

Be it known that I, HARVEY D. WILLIAMS, a citizen of the United States, and resident of Wallingford, in the county of New Haven and State of Connecticut, have invented certain new and useful Improvement in Power-Transmitting Devices, of which the following is a specification.

This invention relates to power-transmitting devices and particularly to such which permit the speed of the driven part or mechanism to be altered readily. The object of the invention is to provide such a device in the form of a variable speed planetary gear unit of novel construction and of maximum simplicity and efficiency. Other more specific objects will appear from the description hereinafter and the features of novelty will be pointed out in the claims. The present application is a division of another application filed by me in the United States Patent Office on July 13, 1921, Serial #484,287.

In the accompanying drawings, which illustrate an example of the invention without defining its limits, Fig. 1 is a sectional plan view of the improved power transmitting device; Fig. 2 is an end view with parts in section and Fig. 3 is a vertical section on the line 3—3 of Fig. 1, upon an enlarged scale.

The main line shaft 10 is journalled in suitable bearings 11 on the support or base 12, and carries a driving gear 13, here shown as a bevel pinion, in mesh with a corresponding gear 14; the latter is secured rigidly to a sleeve or hollow shaft 15 journalled in a bearing 16 and extending at right angles to the shaft 10, the axes of said shafts intersecting. With the shaft 15 is connected rigidly a plate or cup 17 having an internal gear 18. To the cup 17 is secured rigidly another cup 19, connected rigidly with a hollow shaft 20 journalled in a bearing 21 and having its axis in line with that of the hollow shaft 15.

The internal gear 18 meshes with a plurality of planetary pinions 22 which, together with larger gears 23 rigid with the respective pinions 22, are mounted to turn on axles 24 extending parallel to the axis of the shafts 15, 20, at equal distances from said axis. These axles 24 serve as connecting members for two plates 25 and 26, the former being fitted loosely upon one end of the shaft 15, while the plate 26 is made rigid or integral with a shaft 27 fitted loosely within the hollow shaft 20, the projecting end of said shaft 27 being adapted for connection with the particular device, units or element to be driven. The cups 17, 19 form a housing for the plates 25, 26, the projecting end of the shaft 15, the axles 24, the gears 22, 23, and a pinion 28 in mesh with the gears 23, said pinion being mounted on a shaft 29 extending loosely through the hollow shaft 15. On said shaft 29 is mounted rigidly a spur gear 30 in mesh with a spur pinion 31 on a shaft 32 parallel to the shaft 29 and journalled in stationary bearings 33.

The shaft 32 may be held stationary, or driven at various speeds, in either direction, by the following mechanism: A mitre gear 34 on said shaft 32 meshes with a like mitre gear 35 on a short shaft parallel to the main line shaft 10 and journalled in a stationary bearing 36. By a flexible coupling 37 of any approved construction, said short shaft is connected with an aligning shaft 38 which is the driven or "output" shaft of a hydraulic variable speed gear indicated at 39; the driving or "input" shaft of such speed gear is indicated at 40, and its bearing at 41. The shaft 40 is operated in any suitable manner, for instance from the main line shaft 10, by means of a chain drive indicated at 42. The hydraulic variable speed gear indicated at 39 is of a type well-known in the art, an example being found in United States Letters Patent No. 925,148 issued to me on June 15, 1909. Apparatus of this kind embodies two halves or sections, as plainly indicated in Fig. 1, where the right-hand half of each device 39 is the driving or "input" section, and the left-hand half constitutes the driven or "output" section. The details of this variable speed gear have not been illustrated herein, but it will be understood that each of the shafts 38 and 40 is connected with a set of cylinders and with a rotary "swash-plate" which is held oblique or inclined, at a fixed angle, in the "output" or left-hand section, while in the "input" or right-hand section the swash-plate may be adjusted to different angles, as by turning the wheel 43, which may be considered the equivalent of the handwheel 38 shown in my aforesaid patent. It will be understood that when the swash-plate of the driving section is perpendicular to the shaft 40, the shaft 38 will remain stationary, and the pinion 28 likewise, so that the gearing interposed between the shafts 15 and 27 will operate after the manner of an ordinary planetary transmission, with the exception that there is an increase in speed owing to the fact that, instead of having the same gear (such as 23) engage both the rotating driving gear 18 and the stationary toothed member 28, there are two connected gears 22, 23 of which the smaller engages the driving gear 18 while the other, 23, rolls on the stationary member 28. With the numbers of teeth on the several gears as shown on the drawing, a speed of 298 R. P. M. on the main line shaft 10 will give a speed of 108⅓ R. P. M. on the housing 17, 19, and 100 R. P. M. to the driven shaft 27 when the pinion 28 is held stationary. If by turning the wheel 43 the swash-plate of the driving section is set obliquely to the shaft 40, the output shaft 38 and the shaft 29 will be driven in one direction or the other, according to whether the direction of obliquity is the same as that of the fixed-angle swash-plate on the driven side, or opposite thereto, and the speed of said shafts 38, 29 will depend on the angle which the swash-plate of the driving or "input" section forms with a plane perpendicular to the shaft 40. A differential motion of the shaft 27 is thus obtained, the shaft 15 driving the said shaft 27 in one direction, by the mechanism described, and the pinion 28, on which such mechanism rolls, rotating it in either one direction or the other, at a variable speed, so that the motion imparted to the shaft 27 by the internal gear 18 will either be accelerated or retarded, within certain limits, by the simultaneous rotation of the pinion 28. In some cases it may suffice to provide for acceleration only, or for retardation only, that is to say, in such cases it will not be necessary to reverse the inclination of the adjustable swash-plate. Also, the flexible coupling 37 might be omitted in some cases, in which event the mitre gear 35 would be mounted directly on the "output" shaft 38. I may thus effect a very accurate adjustment of the speed at which the shaft rotates.

Various changes in the specific form shown and described may be made within the scope of the claims without departing from the spirit of the invention.

I claim:

1. A device of the class described, comprising two co-axial gears, a shaft to the end of which one of said gears is secured, a tubular shaft to which the other of said gears is connected, said tubular shaft surrounding the first-named shaft, a third shaft in axial alignment with the first-named shaft and spaced therefrom, a rotary carrier fitted loosely on said tubular shaft and secured to that end of said third shaft which is adjacent to the gear-carrying end of the first-named shaft, toothed rolling means mounted to turn on said carrier and in mesh with both of said gears, and independent means for driving the first-named shaft and the tubular shaft respectively.

2. A device of the class described, comprising two spaced co-axial tubular shafts and bearings in which they are journalled, a member interposed between said tubular shafts and held to rotate with both of them, said member having an internal gear, a third shaft extending into said member through one of said tubular shafts and having an external gear within said member, a fourth shaft extending into said member through the other tubular shaft, a carrier held to rotate with said fourth shaft and located within said member, and toothed rolling means mounted to turn on said carrier and in mesh with both of said gears.

In testimony whereof I have hereunto set my hand.

HARVEY D. WILLIAMS.